US012683870B2

(12) United States Patent
Arora et al.

(10) Patent No.: US 12,683,870 B2
(45) Date of Patent: Jul. 14, 2026

(54) SYSTEMS AND METHODS FOR CONFIGURING NETWORK ARCHITECTURE USING ADVANCED COMPUTATIONAL MODELS FOR DATA ANALYSIS AND AUTOMATED PROCESSING

(71) Applicant: BANK OF AMERICA CORPORATION, Charlotte, NC (US)

(72) Inventors: Saurabh Arora, Gurugram (IN); Sandeep Kumar Chauhan, Hyderabad (IN); Shailendra Singh, Thane West (IN); Sujatha Ambati, Hyderabad (IN); Ravikiran Subramanya Rao, Hyderabad (IN); Jagadish Reddy, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/437,386

(22) Filed: Feb. 9, 2024

(65) Prior Publication Data

US 2025/0260626 A1 Aug. 14, 2025

(51) Int. Cl.
| | |
|---|---|
| *G06F 15/177* | (2006.01) |
| *H04L 41/08* | (2022.01) |
| *H04L 41/16* | (2022.01) |
| *H04L 43/08* | (2022.01) |

(52) U.S. Cl.
CPC .............. *H04L 41/16* (2013.01); *H04L 41/08* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 6,639,910 B1 | 10/2003 | Provencher |
| 6,870,844 B2 | 3/2005 | Tuck |
| 7,068,667 B2 | 6/2006 | Foster |
| 7,263,091 B1 | 8/2007 | Woo |

(Continued)

FOREIGN PATENT DOCUMENTS

EP 1501247 B1 5/2008

*Primary Examiner* — Phuoc H Nguyen
(74) *Attorney, Agent, or Firm* — Moore & Van Allen PLLC; William Walters

(57) ABSTRACT

Systems, computer program products, and methods are described herein for configuring network architecture using advanced computational models for data analysis and automated processing. The present disclosure is configured to receive a service request, wherein the service request comprises configuring a node to complete the service request; determine a protocol based on the service request, wherein the protocol comprises evaluating the service request using application servers; determine the node to be used in a network configuration, wherein the node is determined in response to decision compute requirements; arrange, using an artificial intelligence (AI) model, the node into the network configuration, wherein the AI model optimizes the network configuration based on the decision compute requirements and one or more network parameters; and monitor the network configuration using a configuration monitor, wherein the configuration monitor analyzes the one or more network parameters.

18 Claims, 6 Drawing Sheets

(56) References Cited

U.S. PATENT DOCUMENTS

| | | | |
|---|---|---|---|
| 7,298,752 B2 | 11/2007 | Moriwaki | |
| 7,330,468 B1 | 2/2008 | Tse-Au | |
| 7,411,945 B2 | 8/2008 | Monette | |
| 7,411,953 B2 | 8/2008 | Monette | |
| 7,483,998 B2 | 1/2009 | Rabinovitch | |
| 7,801,041 B2 | 9/2010 | Tse-Au | |
| 7,990,965 B1 | 8/2011 | Aggarwal | |
| 8,458,341 B2 * | 6/2013 | Larson | G06F 21/606 |
| | | | 709/227 |
| 8,625,593 B2 | 1/2014 | Tse-Au | |
| 8,625,611 B2 | 1/2014 | Tse-Au | |
| 8,625,985 B2 | 1/2014 | Tse-Au | |
| 8,693,470 B1 | 4/2014 | Maxwell | |
| 9,294,406 B2 | 3/2016 | Liou | |
| 10,461,873 B1 | 10/2019 | Cai | |
| 11,329,911 B2 | 5/2022 | Suryanarayana | |
| 2010/0061391 A1 | 3/2010 | Sindhu | |
| 2018/0376357 A1 * | 12/2018 | Tavares Coutinho | H04W 64/003 |
| 2019/0090158 A1 * | 3/2019 | Das | H04L 67/12 |
| 2019/0174322 A1 * | 6/2019 | Deviprasad | H04L 41/04 |
| 2020/0133255 A1 * | 4/2020 | Cella | H04L 67/12 |
| 2020/0244605 A1 * | 7/2020 | Nagaraja | H04L 51/02 |
| 2022/0197773 A1 * | 6/2022 | Butler | G06F 9/505 |
| 2022/0292377 A1 * | 9/2022 | Benedetti | G06N 20/10 |
| 2022/0360958 A1 * | 11/2022 | Cui | H04W 4/50 |
| 2023/0146162 A1 * | 5/2023 | Chun | H04W 60/00 |
| | | | 455/435.2 |
| 2025/0081081 A1 * | 3/2025 | Shan | H04W 76/12 |

* cited by examiner

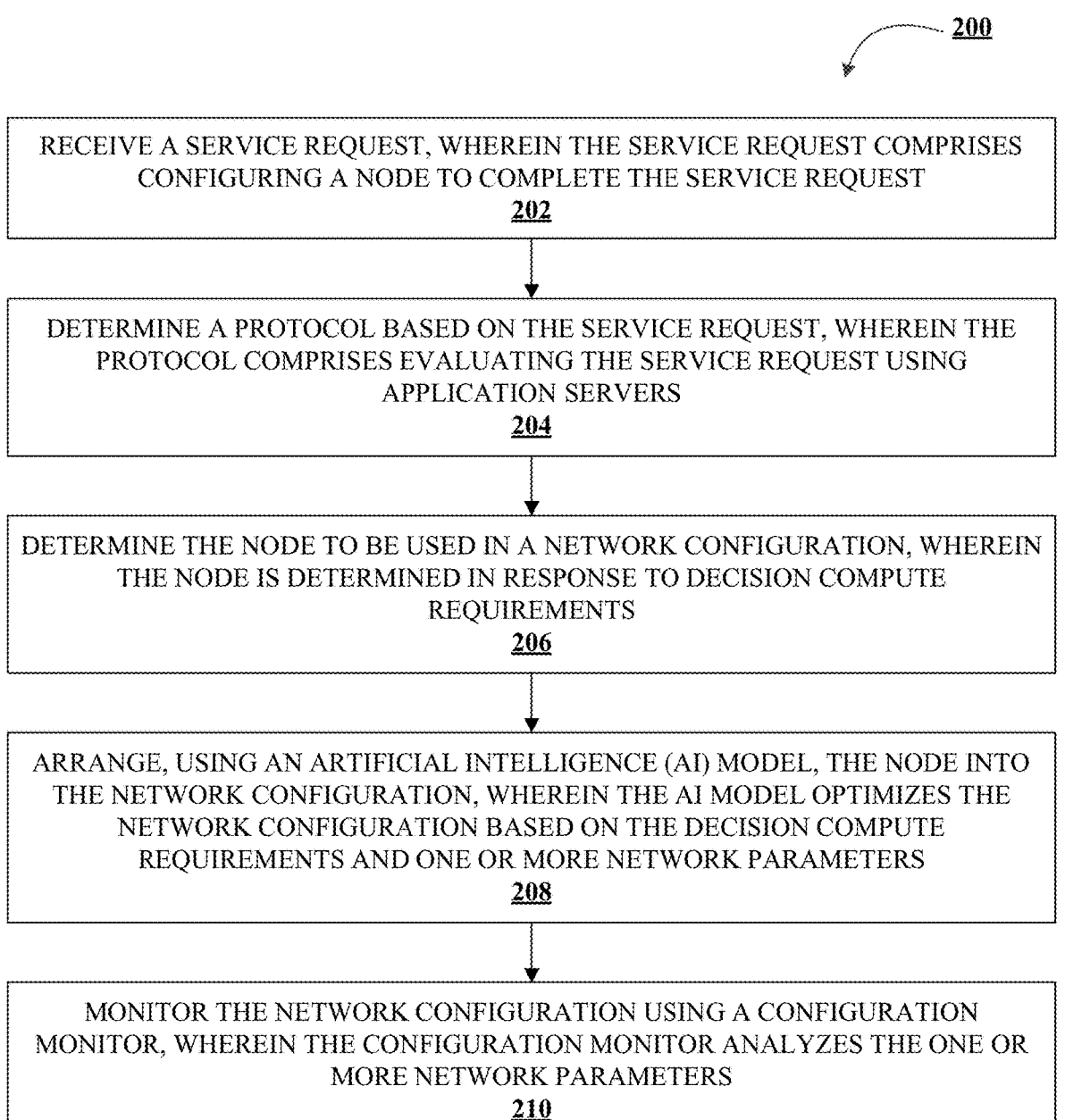

200

RECEIVE A SERVICE REQUEST, WHEREIN THE SERVICE REQUEST COMPRISES CONFIGURING A NODE TO COMPLETE THE SERVICE REQUEST
202

DETERMINE A PROTOCOL BASED ON THE SERVICE REQUEST, WHEREIN THE PROTOCOL COMPRISES EVALUATING THE SERVICE REQUEST USING APPLICATION SERVERS
204

DETERMINE THE NODE TO BE USED IN A NETWORK CONFIGURATION, WHEREIN THE NODE IS DETERMINED IN RESPONSE TO DECISION COMPUTE REQUIREMENTS
206

ARRANGE, USING AN ARTIFICIAL INTELLIGENCE (AI) MODEL, THE NODE INTO THE NETWORK CONFIGURATION, WHEREIN THE AI MODEL OPTIMIZES THE NETWORK CONFIGURATION BASED ON THE DECISION COMPUTE REQUIREMENTS AND ONE OR MORE NETWORK PARAMETERS
208

MONITOR THE NETWORK CONFIGURATION USING A CONFIGURATION MONITOR, WHEREIN THE CONFIGURATION MONITOR ANALYZES THE ONE OR MORE NETWORK PARAMETERS
210

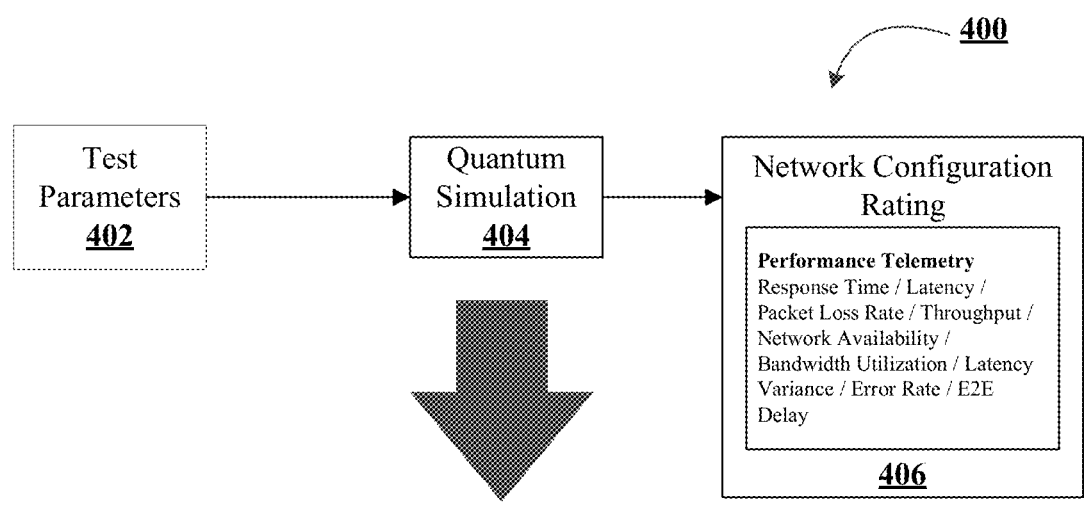
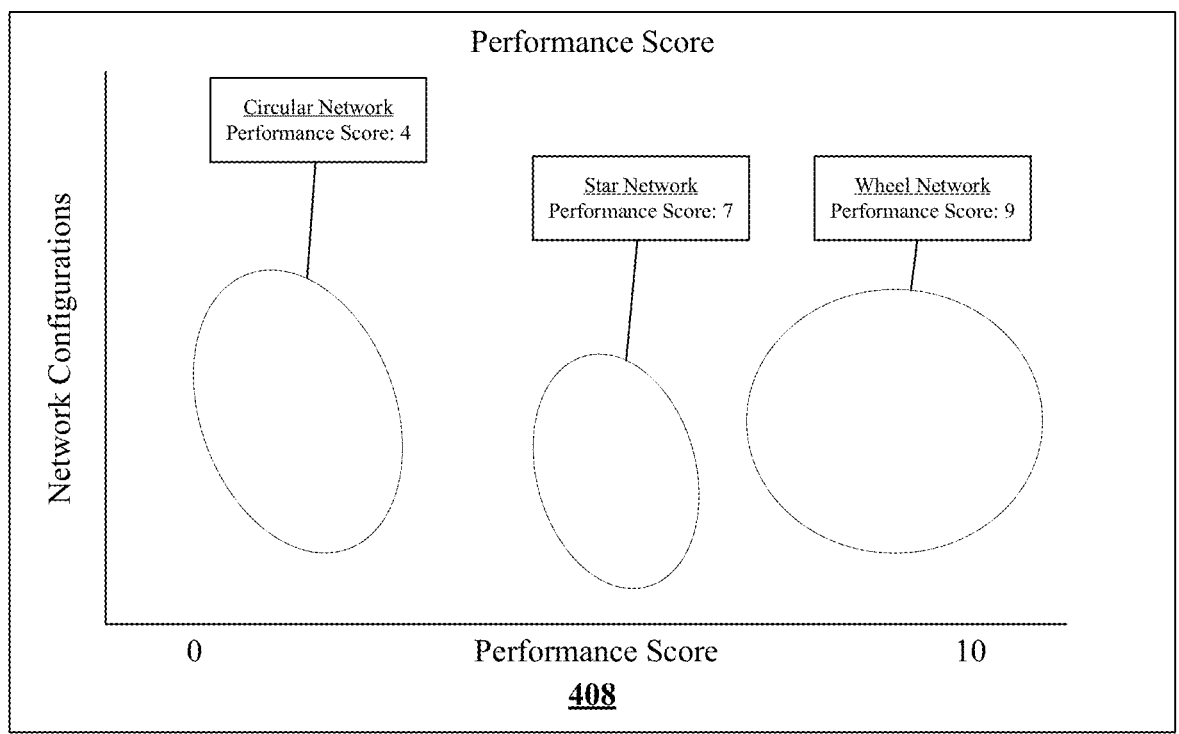
FIGURE 4

SYSTEMS AND METHODS FOR CONFIGURING NETWORK ARCHITECTURE USING ADVANCED COMPUTATIONAL MODELS FOR DATA ANALYSIS AND AUTOMATED PROCESSING

TECHNOLOGICAL FIELD

Example embodiments of the present disclosure relate to configuring network architecture using advanced computational models for data analysis and automated processing.

BACKGROUND

There are significant challenges with configuring nodes on a network. Applicant has identified a number of deficiencies and problems associated with configuring network architecture. Through applied effort, ingenuity, and innovation, many of these identified problems have been solved by developing solutions that are included in embodiments of the present disclosure, many examples of which are described in detail herein.

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for configuring network architecture using advanced computational models for data analysis and automated processing.

Embodiments of the present invention address the above needs and/or achieve other advantages by providing apparatuses (e.g., a system, computer program product, and/or other devices) and methods for configuring network architecture using advanced computational models for data analysis and automated processing. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present invention receives a service request, wherein the service request includes configuring a node to complete the service request. In some embodiments, the present invention determines a protocol based on the service request, wherein the protocol includes evaluating the service request using application servers. In some embodiments, the present invention determines the node to be used in a network configuration, wherein the node is determined in response to decision compute requirements. In some embodiments, the present invention arranges, using an artificial intelligence (AI) model, the node into the network configuration, wherein the AI model optimizes the network configuration based on the decision compute requirements and one or more network parameters. In some embodiments, the present invention monitors the network configuration using a configuration monitor, wherein the configuration monitor analyzes the one or more network parameters.

In some embodiments, the application servers include application rules, wherein the application rules include mapping the service request to a network type, and adjusting, in real time, the network type in response to the service request.

In some embodiments, the decision compute requirements further include service request parameters, wherein the service request parameters include resource requirements associated with the service request. In some embodiments, the decision compute requirements further include a node configuration, wherein the node configuration includes the processing capabilities of the node and health status of the node. In some embodiments, the decision compute requirements further include a node priority, wherein the node priority includes assigning a role to the node, wherein the role includes a leader node and a worker node.

In some embodiments, the decision compute requirements further include a prior node configuration, wherein the prior node configuration includes the node's state from prior iterations.

In some embodiments, the network configuration includes a circular network, a wheel network, or a star network.

In some embodiments, the AI model includes a generative AI model, wherein the generative AI model considers previous network configurations to determine the network configuration.

In some embodiments, the one or more network parameters includes a network health, wherein the network health includes the health of the network configuration. In some embodiments, the one or more network parameters includes a network feed, wherein the network feed includes the amount of data transmitted via the service request.

In some embodiments, the present invention determines, using a quantum simulation, a probabilistic distribution of the network configuration.

In some embodiments, the present invention implements, in response to detecting an anomaly, a secure zone, wherein the secure zone corresponds with the network configuration where the anomaly was detected.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
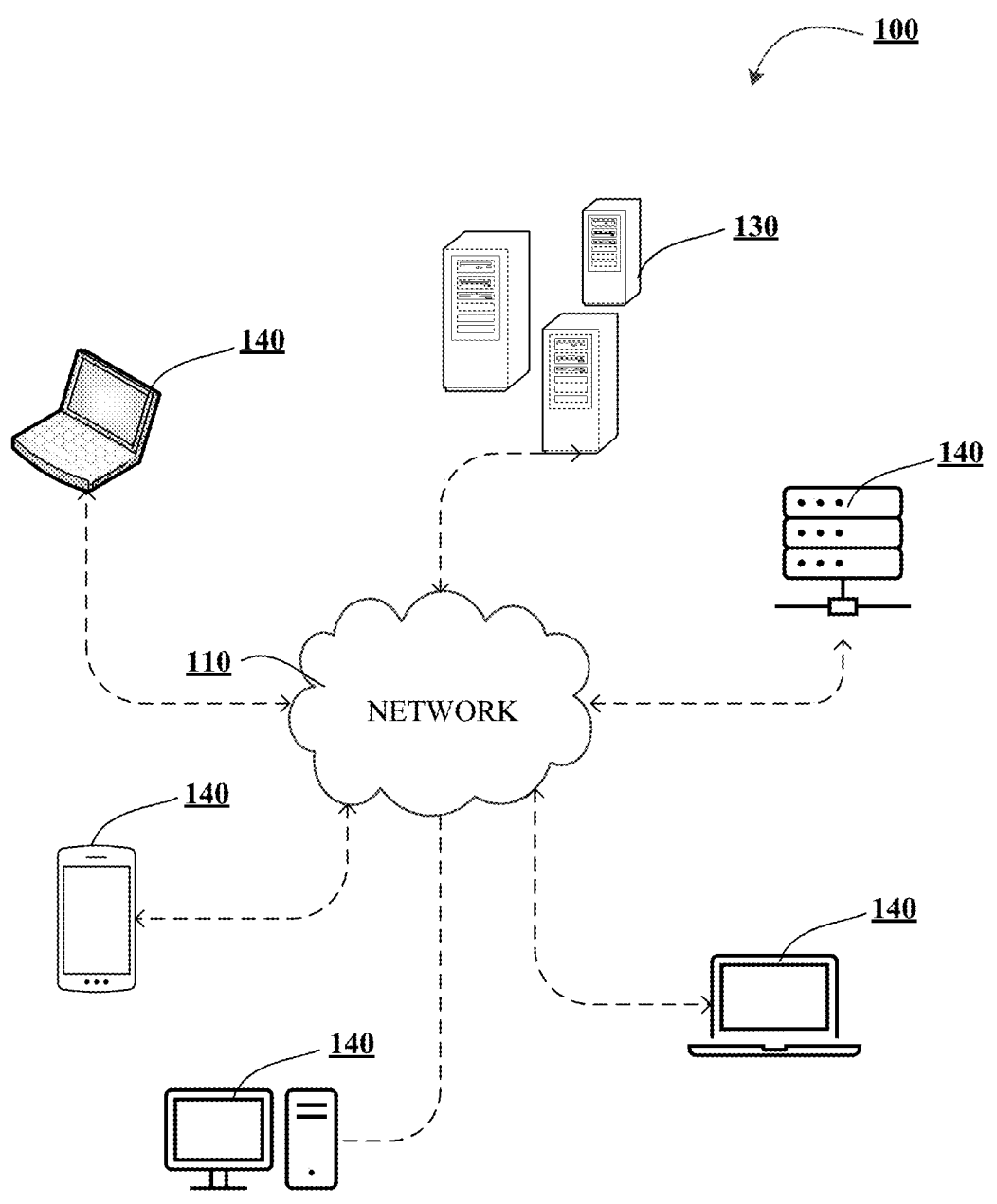
Figure 1B:
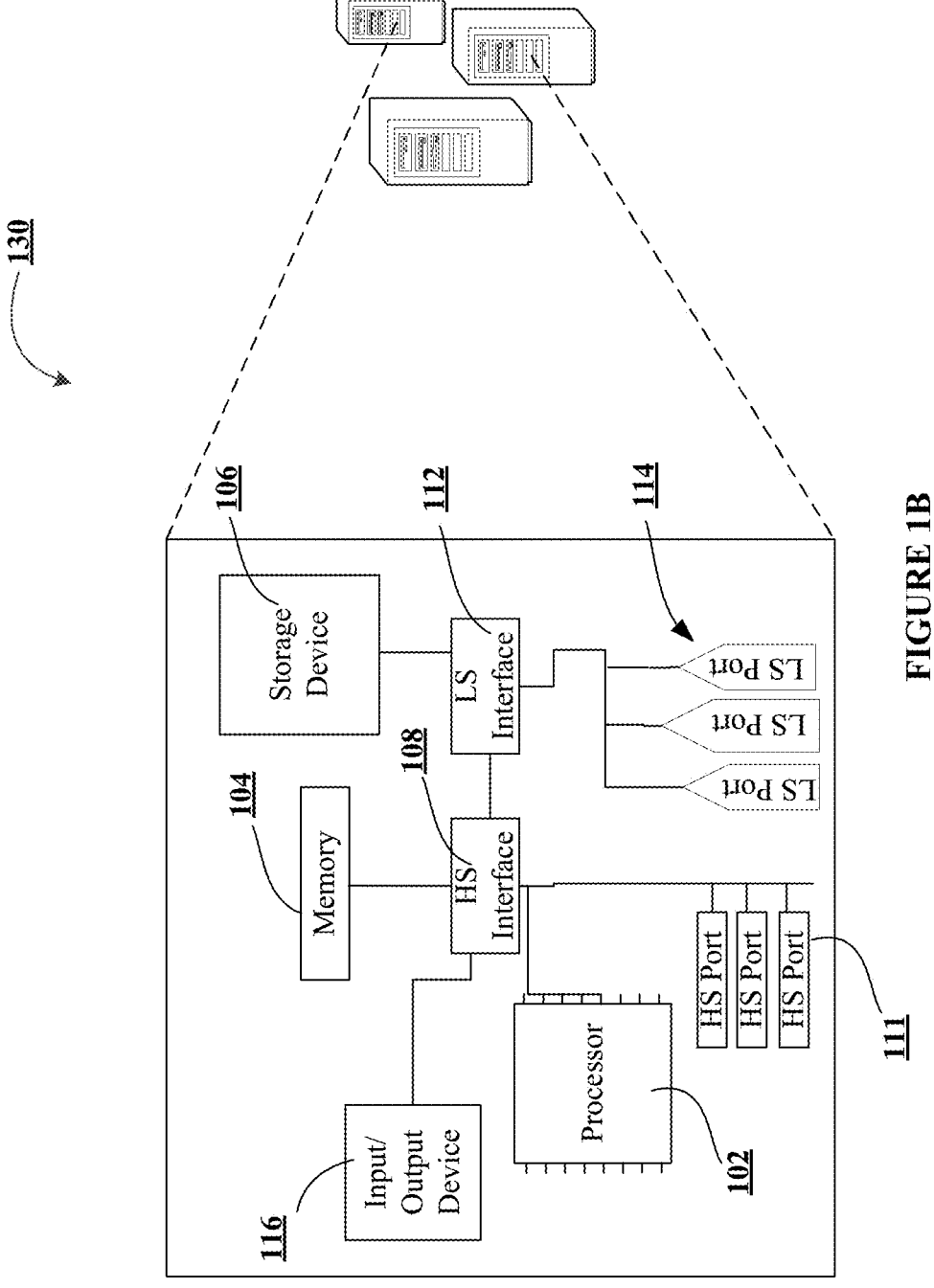
Figure 1C:
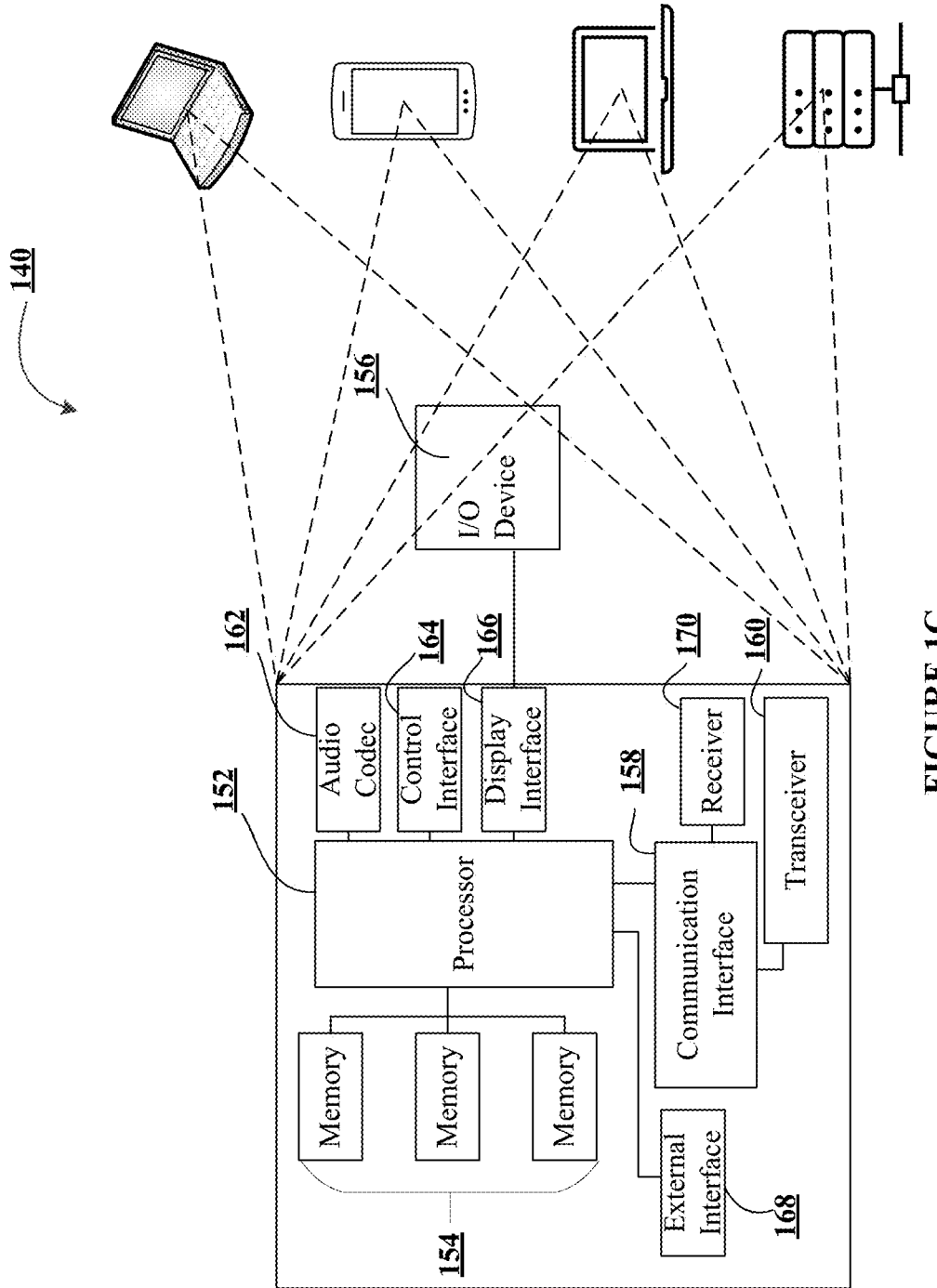
Figure 3:
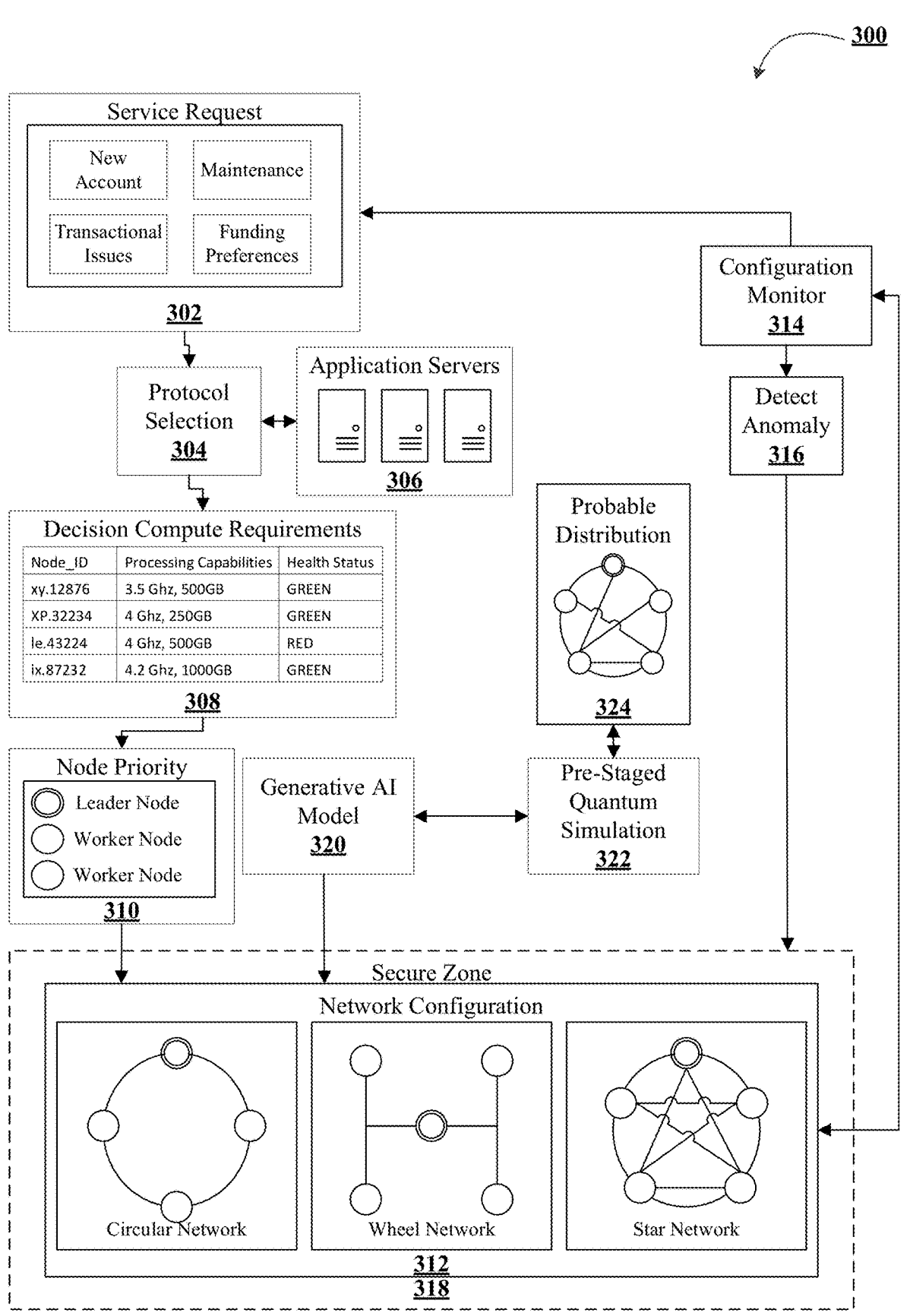

FIGS. 1A-1C illustrates technical components of an exemplary distributed computing environment for configuring network architecture using advanced computational models for data analysis and automated processing, in accordance with an embodiment of the disclosure;

FIG. 2 illustrates a process flow for configuring network architecture using advanced computational models for data analysis and automated processing, in accordance with an embodiment of the disclosure;

FIG. 3 illustrates an example embodiment of the system described herein, in accordance with an embodiment of the disclosure; and FIG. 4 illustrates an example embodiment of the quantum simulation to determine a probabilistic distribution of the network configuration, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In modern computing and networking environments, network layouts and configurations are setup based on the different needs from different applications and components within larger applications. The differences in needs of the application lead to different network configurations. A network can be organized by arranging the nodes associated with the network in a specific manner. These nodes can be grouped into clusters specific for an application's needs. For example, some applications may need publish/subscribe architecture while other applications may need more sequential architecture.

The network configurations are traditionally setup by technology teams with the respective calls being routed to the specific network setup required. In some cases, issues arise with initial network configurations which may lead to overconsumption of resources to determine the correct network configuration, compute requirements, node prioritization, and network build configuration. Further, downtime of the network leads to incurred costs and resource consumption. In addition, if a detected issue is severe enough, a redundant, alternate network may be constructed while the issue is resolved. The redundant network not only leads to an increase in cost, but also delays transaction completion rates. Therefore, a need exists to identify network configuration requirements, generate those network layouts, and setup and deploy the network architectures in real time.

The present disclosure describes a system that may setup a network architecture using generative artificial intelligence (AI). An application may interact with the system, wherein the application may need a certain network configuration to perform a task. The system may use generative AI to determine the most appropriate network configuration for the task. In this way, the generative AI may determine the number of nodes needed, the configuration of the nodes, the node priority, and the like. The node selection and configuration may be based on the availability of certain nodes and their respective processing capabilities. The system may also include a configuration monitor that monitors the network configuration. The configuration monitor may make adjustments to the network configuration if the network has issues arise, such as a reconfiguration of the node layout. The system may constantly monitor the network configuration to determine which network configurations perform well under certain circumstances. The system may use that information in the future to determine how future networks should be configured.

In this way, the system may be capable of identifying network requirements for incoming service requests, generating layouts (e.g., node layouts) on its own, arranging and configuring the nodes, setting up dynamic networks, and making the networks functional in real time. The system may have the capability to identify network errors and application anomalies and introduce additional secure zone setups to isolate comprised nodes. The additional secure zone may mitigate uncertainties associated with the comprised nodes within the newly created network. Generative AI drive network layouts may generate requirements, decision compute needs, and the like which may consider previous configurations for quicker and more responsive network setups. Further, quantum simulations may assist with pre-staging the network configuration for faster deployment.

What is more, the present disclosure provides a technical solution to a technical problem. As described herein, the technical problem includes issues associated with conventional network configuration setups and maintenance, including node layout selection, node prioritization, and the like. The technical solution presented herein allows for real time analysis of a network to determine the most appropriate network configuration and node selection. In particular, the system described herein is an improvement over existing solutions to conventional network configuration systems, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

In addition, the technical solution described herein is an improvement to computer technology and is directed to non-abstract improvements to the functionality of a computer platform itself. Specifically, the network architecture configuration system (e.g., system 130) as described herein is a solution to the problem of the issues associated with conventional network configuration systems. Further, the network architecture configuration system may be characterized as identifying a specific improvement in computer capabilities and/or network functionalities in response to the network architecture configuration system's integration to existing devices, software, applications, and/or the like. In this way, the network architecture configuration system improves the capability of a system to determine, in real time, a network configuration while continually monitoring the selection and updating the network configuration. Further, the network architecture configuration system improves the functionality of networks in response to reducing the resources consumed by the system (e.g., network resources, computing resources, memory resources, and/or the like).

FIGS. 1A-1C illustrate technical components of an exemplary distributed computing environment 100 for configuring network architecture using advanced computational models for data analysis and automated processing, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 illustrates a process flow for configuring network architecture using advanced computational models for data analysis and automated processing, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, a network architecture configuration system (e.g., similar to one or more of the systems described herein with respect to FIGS. 1A-1C) may perform one or more of the steps of process flow 200. For example, a network architecture configuration system (e.g., the system 130 described herein with respect to FIGS. 1A-1C) may perform the steps of process flow 200.

As shown in block 202, the process flow 200 of this embodiment includes receiving a service request, wherein the service request includes configuring a node to complete the service request. In some embodiments, the service request may be associated with an application. The application may be associated with a device, wherein the device may include a user device, an entity device, a third party device, or the like. The device may include a personal computer, a mobile phone, a server, a tablet, a kiosk, or the like. The service request may correspond to the type of application. For instance, if an application is configured for a mobile telephone, the service request associated with the application may have specific actions associated with it. In another example, the device may be an automated teller machine (ATM), wherein the ATM is running an application that sends a service request to the network architecture configuration system (e.g., system 130). In this way, the ATM's application may have specific service requests that need a particular network configuration to complete a task on the ATM.

The service requests themselves may contain instructions associated with the transmission of data, entry of data, on the user-side of the application, on the back end of the application, or the like. For instance, and as shown in block 302 of FIG. 3, the service requests may include a new account setup, maintenance of an account, reporting transactional issues, or funding preferences. In this way, the service request may be a specific function (e.g., module) within an application. Further, in some embodiments, the service request may be specific to the device that is running the application. In some embodiments, the service request may include different activities within different applications based on which application is running.

In an example embodiment, the service request may have at least some influence over the network configuration. In this way, the service request may need the nodes to be arranged in a particular way according to the function the service request will carry out. For instance, if the service request deals with a customer purchasing a subscription, the system may first need to gather customer details, then select which product the customer wishes to subscribe to, and then the customer may make a payment. In this way, the node layout may be linear.

As shown in block 204, the process flow 200 of this embodiment includes determining a protocol based on the service request, wherein the protocol includes evaluating the service request using application servers. As used herein, the protocol may be based on where the service request originates from. In this way, the protocol can be based on how the application was arranged, what network topology (e.g., layout) has been used in the past with this type of service request, and the like. As shown in block 304 of FIG. 3, the protocol selection may take place after the service request was received. The protocol selection may include using the application servers 306 to determine which protocol should be chosen based on the service request 302.

In some embodiments, the application servers include application rules. Some of these rules may include mapping the service request to a network type. The mapping (e.g., network mapping) may include storing the protocols used throughout the system previously. In other words, the application servers may store prior network configurations that were used based on the service request received. These application rules may be stored in application servers (e.g., application servers 306) and may be accessed during protocol selection.

Further, in some embodiments, the application rules may include adjusting, in real time, the network type in response to the service request. In some embodiments, the adjustments may be based on historical versions and/or configurations of the network for a given service request.

As shown in block 206 of FIG. 2, the process flow 200 of this embodiment includes determining the node to be used in a network configuration, wherein the node is determined in response to decision compute requirements. The decision compute requirements may provide information about the state of one or more nodes that may be used in the network configuration. As shown in block 308 of FIG. 3, the decision compute requires 308 may include information about a node's current state, for example. With this information, the system may determine whether that node may be used in the network configuration for the received service request.

In some embodiments, the decision compute requirements may include service request parameters, wherein the service request parameters include resource requirements associated with the service request; a node configuration, wherein the node configuration includes the processing capabilities of the node, and health status of the node; and a node priority, wherein the node priority includes assigning a role to the node, wherein the role includes a leader node and a worker node.

The service request parameters may include information related to the service request. In some embodiments, this may include how many nodes are needed to complete the service request, the processing power the service request requires, and how much memory is needed for the service request. In some embodiments, the decision compute requirements may include the current state of the network. For instance, the decision compute requirements may include the current (e.g., real time) load on the network.

Further, the decision compute requirements 308 may include information related to the node. In this example, the system may compare the needs of the service request with the real-time node information. If the service request requires, for example, a 700 gigabyte (GB) node, with 3.0 gigahertz (Ghz) of processing power, the system may search through the list of nodes in the decision compute requirements 308 that will be able to provide the requirements of the service request. In some embodiments, the system may choose one or more nodes to complete the service request based on the real time decision compute requirements.

In some embodiments, the node priority may include the previous priority configurations of the node for a given service request. As shown in block 310 of FIG. 3, this may include a determination of which node was the leader node and which node(s) were the worker node(s). The node priority may also determine, for the current service request, the order in which the nodes should be arranged and how they should communicate with each other. For instance, if the decision compute requirements show that three nodes (Node A, Node B, and Node C) should be chosen to complete the service request, the node priority for these nodes may also be determined. The node priority may lead to the system choosing Node B as the leader node while Nodes A and C are the worker nodes. The system may also choose the communication configuration between the nodes which may include, for example, Nodes A and C only communicating with Node B (and not with each other), or Nodes A and C communicating with Node B and also each other.

In some embodiments, the decision compute requirements further include a prior node configuration, wherein the prior node configuration includes the node's state from prior iterations. In some embodiments, the network configuration may include a circular network, a wheel network, or a star network. As shown in block 312 of FIG. 3, the network configurations may take several layouts. For example, the circular network may organize the nodes in such a way that a single node is connected to only two other nodes. In a wheel network, for example, the worker nodes may only be connected to the leader node. In another example, a star network may arrange the nodes so that all of the nodes are in communication with every other node on the network. The different network configurations may be more suited for different operations (e.g., service requests) that should be completed by the network.

As shown in block 208 of FIG. 2, the process flow 200 of this embodiment includes arranging, using an artificial intelligence (AI) model, the node into the network configuration, wherein the AI model optimizes the network configuration based on the decision compute requirements and one or more network parameters. In some embodiments, the AI model may include a generative AI model, wherein the generative AI model may consider previous network configurations to determine the network configuration. The previous network configurations may relate to the same or similar service requests that have been received by the system in the past. In this way, the system may learn from the previous service requests and corresponding network configurations to determine the network configuration that should be implemented for the current state. The generative AI model may determine the previous network configurations in real time.

As shown in block 320 of FIG. 3, the generative AI model may arrange the nodes in a way that optimizes the network configuration. In this way, the generative AI may consider any number of previous network configuration(s) as well as the current network configuration to determine how the nodes should be arranged. Further, the generative AI may look at the nodes specifically to determine where each node should be positioned within the network. For example, if a node is being considered for an intensive processing task (e.g., a service request), then the generative AI model may consider the node's processing capabilities as well as the current network's load to determine the positioning of the node.

As shown in block 210, the process flow 200 of this embodiment includes monitoring the network configuration using a configuration monitor, wherein the configuration monitor analyzes the one or more network parameters. As shown in block 314 of FIG. 3, the configuration monitor may monitor the network configuration on a regular or continuous basis. In some embodiments, the configuration monitor may check the network configuration on an interval basis, wherein the intervals may be based on time, triggering events, activity, network load, or the like.

The configuration monitor may update, or provide recommendations for updates to, the network configuration. In this way, the configuration monitor may analyze the nodes associate with the network configuration to ensure they are meeting function requirements, performing tasks, are considered healthy, and the like. If the configuration monitor detects a node is not performing as intended, the configuration monitor may replace the node with another node in the network configuration. Similarly, if the network configuration becomes overloaded and additional nodes are required for the network configuration, the configuration monitor may assign nodes to the network configuration.

In addition, the configuration monitor may decide the network should be reconfigured. In this way, the network configuration may need to be reconfigured from its initial layout (e.g., circular network, wheel network, star network) to a different configuration. The configuration monitor may optimize the network by changing the network configuration in real time.

In some embodiments, the one or more network parameters may include a network health, wherein the network health includes the health of the network configuration. The network health may relate to how the network is functioning overall and may include bandwidth usage, latency, packet loss, error rate, throughput, network availability, network uptime, jitter, processing utilization, response time, security incidents, quality of service, topology changes, and the like. In some embodiments, the overall health of the network may indicate how the network configuration is performing for a give service request. Further, in some embodiments, the configuration monitor may determine the network configuration should be adjusted based on the network health. In this way, if the network health is determined to be poor (e.g., low health), then the configuration monitor may take action to reconfigure the current network configuration in order to increase the health of the network.

In some embodiments, the one or more parameters associated with the network configuration may include a network feed, wherein the network feed includes the amount of data transmitted via the service request.

In some embodiments, the system may determine, using a quantum simulation, a probabilistic distribution of the network configuration. In some embodiments, the quantum simulation may determine how the network configurations are performing, assign a score for them, and confirm the deployment of the well-performing network configuration. For example, a specific network configuration may have been recommended by the generative AI model. The quantum simulation may then run its own simulation to determine which network configuration may be the most effective configuration. The quantum simulation may recommend the same or a different network configuration than the generative AI model. In this way, the quantum simulation may leverage complex analytical simulations to determine the network configuration that should be implemented.

As shown in block 402 of FIG. 4, the quantum simulation may ingest test parameters 402 from the network configuration, the system, the generative AI model, or any other component of the system. The quantum simulation 404 may produce a network configuration rating 406 used to create a performance score 408 for each of the network configurations. In some embodiments, the network configuration rating 406 may include ratings for performance telemetry parameters such as: response time, latency, packet loss rate, throughput, network availability, bandwidth utilization, latency variance, error rate, end-to-end (E2E) delay, or the like. The network configuration rating 406 may be based on any scoring procedure and may relate to all of the potential network configurations of the system. Depending on the performance score 408, a network configuration may be chosen. For instance, if the system needs a network configuration that produces fast response times and low latency for performance requirements, a network configuration with a fast response time and low latency rating may be chosen as the network configuration.

As shown in block 324 of FIG. 3, in some embodiments, the system may use the generative AI and quantum simulation model to determine the most appropriate network configuration. This may include analyzing prior network configurations and how they have performed along with the performance telemetry scores of those network configurations. The service requests that have been received in the past may also be used to determine which network configurations are best suited for the service request. In this way, when a new service request is received, the generative AI's recommended network configurations may be run through a quantum simulation to determine which network configuration may be most effective for the current service request.

Further, as shown in block 322 of FIG. 3, the pre-staging of the networks using the quantum simulation may include making networks readily available in real time for the network configuration. In this way, the pre-staged networks may be swapped in for the current network configuration. There may be many reasons for swapping a pre-staged network configuration including timing efficiency (e.g., the current network configuration may be best suited for an initial stage while a different network configuration is better suited for a later stage operation), downtime with the current network configuration, errors with the current network configuration, or the like.

In some embodiments, the system may implement, in response to detecting an anomaly, a secure zone, wherein the secure zone corresponds with the network configuration where the anomaly was detected. As used herein, an anomaly may include a deviation from the expected behavior of the network system, and may include performance issues, security breaches, hardware malfunctions, software malfunctions, configuration errors, or the like. Specifically, anomalies can take the form of traffic spikes, unusual traffic patterns, high error rates, unauthorized devices on the network, response time variability, unusual bandwidth consumption, suspicious device logins, or the like. As shown in block 316 of FIG. 3, when the configuration monitor may detect an anomaly. As shown in block 318 of FIG. 3, once an anomaly is detected, the location of the anomaly may be identified and a secure zone may be implemented around the anomaly's location. The secure zone may include extra security measures along with correcting any issues the anomaly may have caused. In this way, the secure zone may include network segmentation, firewalls, intrusion detection and prevention, virtual private networks, data encryption, or the like. For example, if an unauthorized device is detected, the configuration monitor may remove the device from the network, ask the device for authentication details, or the like. Further, the configuration monitor may then implement a firewall to control the traffic associated with the zone where the unauthorized device was detected.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for configuring network architecture using advanced computational models for data analysis and automated processing, the system comprising:
   a processing device;
   a non-transitory storage device containing instructions when executed by the processing device, causes the processing device to perform the steps of:
      receive a service request, wherein the service request comprises configuring a node to complete the service request;
      determine a protocol based on the service request, wherein the protocol comprises evaluating the service request using application servers;
      determine the node to be used in a network configuration, wherein the node is determined in response to decision compute requirements;
      arrange, using an artificial intelligence (AI) model, the node into the network configuration, wherein the AI model optimizes the network configuration based on the decision compute requirements and one or more network parameters;
      monitor the network configuration using a configuration monitor, wherein the configuration monitor analyzes the one or more network parameters; and
      determine, using a quantum simulation, a probabilistic distribution of the network configuration to analyze performance of the network configuration, wherein determining, using the quantum simulation, the probabilistic distribution of the network configuration to analyze performance of the network configuration further comprises recommending a different network configuration than the network configuration recommended by the AI model, and wherein the different network configuration is pre-staged to minimize downtime during implementation.

2. The system of claim 1, wherein the application servers comprise application rules, and wherein the application rules comprise:
   mapping the service request to a network type; and
   adjusting, in real time, the network type in response to the service request.

3. The system of claim 1, wherein the decision compute requirements further comprise:
   service request parameters, wherein the service request parameters comprise resource requirements associated with the service request;
   a node configuration, wherein the node configuration comprises the processing capabilities of the node, and health status of the node; and
   a node priority, wherein the node priority comprises assigning a role to the node, wherein the role comprises a leader node and a worker node.

4. The system of claim 3, wherein the decision compute requirements further comprise a prior node configuration, wherein the prior node configuration comprises the node's state from prior iterations.

5. The system of claim 1, wherein the network configuration comprises a circular network, a wheel network, or a star network.

6. The system of claim 1, wherein the AI model comprises a generative AI model, wherein the generative AI model considers previous network configurations to determine the network configuration.

7. The system of claim 1, wherein the one or more network parameters comprise:

a network health, wherein the network health comprises the health of the network configuration; and a network feed, wherein the network feed comprises the amount of data transmitted via the service request.

8. The system of claim 1, wherein executing the instructions further causes the processing device to implement, in response to detecting an anomaly, a secure zone, wherein the secure zone corresponds with the network configuration where the anomaly was detected.

9. A computer program product for configuring network architecture using advanced computational models for data analysis and automated processing, the computer program product comprising a non-transitory computer-readable medium comprising code causing an apparatus to:

receive a service request, wherein the service request comprises configuring a node to complete the service request;

determine a protocol based on the service request, wherein the protocol comprises evaluating the service request using application servers;

determine the node to be used in a network configuration, wherein the node is determined in response to decision compute requirements;

arrange, using an artificial intelligence (AI) model, the node into the network configuration, wherein the AI model optimizes the network configuration based on the decision compute requirements and one or more network parameters;

monitor the network configuration using a configuration monitor, wherein the configuration monitor analyzes the one or more network parameters; and determine, using a quantum simulation, a probabilistic distribution of the network configuration to analyze performance of the network configuration, wherein determining, using the quantum simulation, the probabilistic distribution of the network configuration to analyze performance of the network configuration further comprises recommending a different network configuration than the network configuration recommended by the AI model and wherein the different network configuration is pre-staged to minimize downtime during implementation.

10. The computer program product of claim 9, wherein the application servers comprise application rules, and wherein the application rules comprise:

mapping the service request to a network type; and adjusting, in real time, the network type in response to the service request.

11. The computer program product of claim 9, wherein decision compute requirements further comprise:

service request parameters, wherein the service request parameters comprise resource requirements associated with the service request;

a node configuration, wherein the node configuration comprises the processing capabilities of the node, and health status of the node; and a node priority, wherein the node priority comprises assigning a role to the node, wherein the role comprises a leader node and a worker node.

12. The computer program product of claim 11, wherein the compute requirements further comprise a prior node configuration, wherein the prior node configuration comprises the node's state from prior iterations.

13. The computer program product of claim 9, wherein the network configuration comprises a circular network, a wheel network, or a star network.

14. The computer program product of claim 9, wherein the AI model comprises a generative AI model, wherein the generative AI model considers previous network configurations to determine the network configuration.

15. The computer program product of claim 9, wherein the one or more network parameters comprise:

a network health, wherein the network health comprises the health of the network configuration; and a network feed, wherein the network feed comprises the amount of data transmitted via the service request.

16. The computer program product of claim 9, wherein the code further causes the apparatus to implement, in response to detecting an anomaly, a secure zone, wherein the secure zone corresponds with the network configuration where the anomaly was detected.

17. A method for configuring network architecture using advanced computational models for data analysis and automated processing, the method comprising:

receiving a service request, wherein the service request comprises configuring a node to complete the service request;

determining a protocol based on the service request, wherein the protocol comprises evaluating the service request using application servers;

determining the node to be used in a network configuration, wherein the node is determined in response to decision compute requirements;

arranging, using an artificial intelligence (AI) model, the node into the network configuration, wherein the AI model optimizes the network configuration based on the decision compute requirements and one or more network parameters;

monitoring the network configuration using a configuration monitor, wherein the configuration monitor analyzes the one or more network parameters; and determining, using a quantum simulation, a probabilistic distribution of the network configuration to analyze performance of the network configuration, wherein determining, using the quantum simulation, the probabilistic distribution of the network configuration to analyze performance of the network configuration further comprises recommending a different network configuration than the network configuration recommended by the AI model, and wherein the different network configuration is pre-staged to minimize downtime during implementation.

18. The method of claim 17, wherein the application servers comprise application rules, and wherein the application rules comprise:

mapping the service request to a network type; and adjusting, in real time, the network type in response to the service request.

* * * * *